(12) United States Patent
Lavie et al.

(10) Patent No.: US 11,915,479 B1
(45) Date of Patent: Feb. 27, 2024

(54) SYSTEMS AND METHODS FOR AUTOMATEDLY IDENTIFYING, DOCUMENTING AND REPORTING VEHICLE DAMAGE

(71) Applicant: Scope Technologies Holdings Limited, Tortola (VG)

(72) Inventors: Samuel Lavie, Caesaria (IL); Friedl Jacobs, Johannesburg (ZA); Sean O'Regan, Johannesburg (ZA); Johann van Den Bergh, Johannesburg (ZA)

(73) Assignee: Scope Technologies Holdings Limited, Road Town Tortola (VG)

( * ) Notice: Subject to any disclaimer, the term of this patent is extended or adjusted under 35 U.S.C. 154(b) by 363 days.

(21) Appl. No.: 17/138,673

(22) Filed: Dec. 30, 2020

Related U.S. Application Data

(60) Provisional application No. 62/955,336, filed on Dec. 30, 2019.

(51) Int. Cl.
| | |
|---|---|
| G06V 20/20 | (2022.01) |
| G06F 18/214 | (2023.01) |
| G06N 3/08 | (2023.01) |
| G06N 5/022 | (2023.01) |
| G06V 20/64 | (2022.01) |

(52) U.S. Cl.
CPC ............ *G06V 20/20* (2022.01); *G06F 18/214* (2023.01); *G06N 3/08* (2013.01); *G06N 5/022* (2013.01); *G06V 20/64* (2022.01)

(58) Field of Classification Search
USPC ........................................................ 382/103
See application file for complete search history.

(56) References Cited

U.S. PATENT DOCUMENTS

| | | | |
|---|---|---|---|
| 8,510,196 B1* | 8/2013 | Brandmaier | G06Q 40/08 |
| | | | 705/35 |
| 9,228,834 B2* | 1/2016 | Kidd | G01C 11/06 |
| 10,657,707 B1* | 5/2020 | Leise | G06T 17/00 |
| 10,692,050 B2* | 6/2020 | Taliwal | G06V 10/82 |
| 10,699,168 B1* | 6/2020 | Xu | G06Q 10/00 |
| 11,144,889 B2* | 10/2021 | Li | G06T 7/001 |
| 11,157,973 B2* | 10/2021 | Fuchs | G06Q 30/0283 |

(Continued)

OTHER PUBLICATIONS

Zhu et al., A Unified Framework of Intelligent Vehicle Damage Assessment based Computer Vision Technology, 2019 IEEE 978-1-7281-5030-7/19, pp. 124-128. (Year: 2019).*

(Continued)

*Primary Examiner* — Ishrat I Sherali
(74) *Attorney, Agent, or Firm* — Downs Rachlin Martin PLLC

(57) ABSTRACT

Using a combination of image recognition, deep learning, and expert rules, disclosed systems and methods automatically identify, assess and estimate damage to vehicles based on input vehicle images. Analysis includes determinations as to type of damage, extent of damage and absolute size of damage. Disclosed embodiments include techniques of homography, allometry and semantic segmentation combined with more conventional object recognition technologies such as R-CNN in order to provide greater precision, more detailed analysis at lower computational cost.

9 Claims, 22 Drawing Sheets

(19 of 22 Drawing Sheet(s) Filed in Color)

(56) References Cited

U.S. PATENT DOCUMENTS 11,676,365 B2 * 6/2023 Kar .................... G06F 18/2413
706/46
2018/0260793 A1 9/2018 Li et al.

OTHER PUBLICATIONS

Ren et al.; "Faster R-CNN: Towards Real-Time Object Detection with Region Proposal Networks"; Jan. 6, 2016; pp. 1-16; arXiv:1506.01497v3.
Dey; "CNN Application-Detecting Car Exterior Damage (full implementable code)"; Jun. 20, 2019; pp. 1-13; https://medium.com/towards-data-science/cnn-application-detecting-car-exterior-damage-full-implementable-code-b28fca70b20f.

* cited by examiner

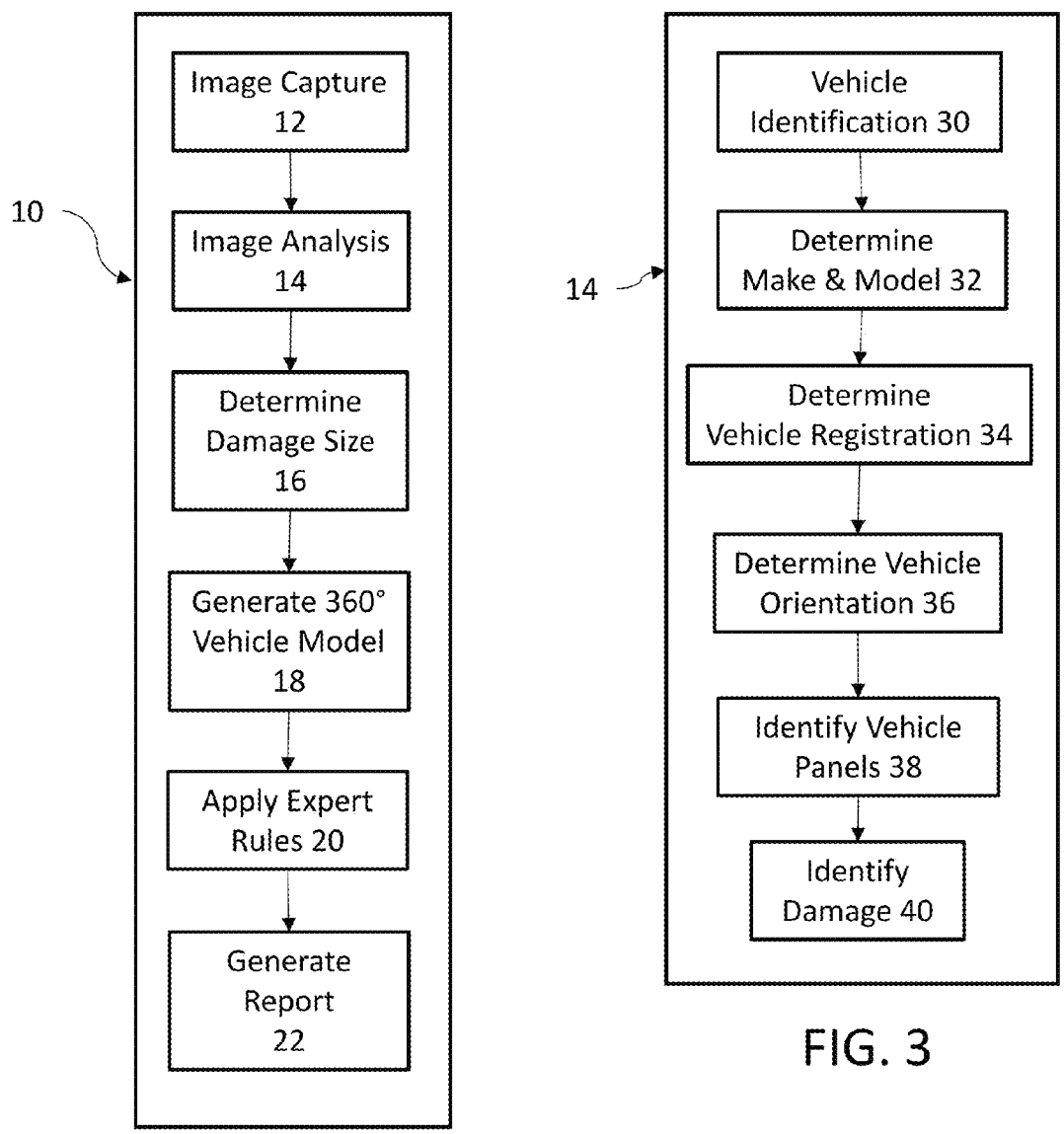
FIG. 1
FIG. 3
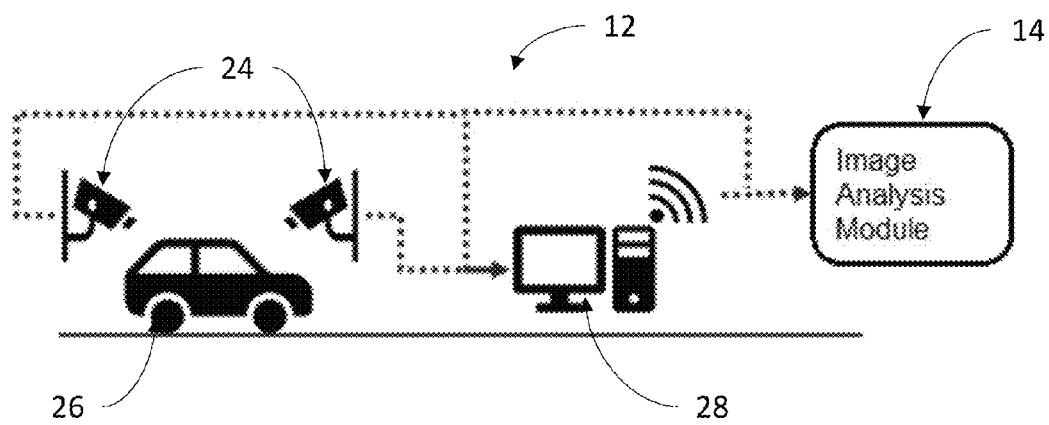
FIG. 2

FIG. 12 Core High Level Architecture

SYSTEMS AND METHODS FOR AUTOMATEDLY IDENTIFYING, DOCUMENTING AND REPORTING VEHICLE DAMAGE

RELATED APPLICATION DATA

This application claims the benefit of priority of U.S. Provisional Patent Application Ser. No. 62/955,336, filed Dec. 30, 2019, and titled "Systems and Methods for Identifying, Documenting and Reporting Vehicle Damage", which is incorporated by reference herein in its entirety.

FIELD OF THE INVENTION

The present disclosure generally relates to the fields of vehicle repair and damage estimation. In particular, the present disclosure is directed to systems and methods for automatedly identifying, documenting and reporting vehicle damage.

BACKGROUND

Recent advances in machine vision, artificial intelligence, neural network and machine learning techniques when applied to object recognition in images have made it possible under certain circumstances to identify vehicle damage using automated systems. There are a variety of machine learning techniques or artificial intelligence methods in the art that go under various names such as artificial neural networks and deep learning. Different methods have differing styles of acquiring knowledge, for example: perceptron, back-propagation, least angle regression. Most method have in common that knowledge is learned by analysis of a training set. For vehicle damage recognition, the goal is to be able to pick out damage to a vehicle exterior based on images of that exterior when compared to images of an undamaged vehicle.

An example of an existing technique for vehicle damage detection employs a mask regional convolutional neural network (Mask R-CNN) is described in S. Dey, *CNN Application-Detecting Car Exterior Damage*, Jun. 20, 2019 (Towards Data Science) https://towardsdatascience.com/cnn-application-detecting-car-exterior-damage-full-implementable-code-1b205e3cb48c. Additional details R-CNN techniques are described in described in S. Ren, et al., *Faster R-CNN: Towards Real-Time Object Detection with Region Proposal Networks*, https://arxiv.org/abs/1506.01498v3 [cs.CV], 6 Jan. 2016. (Each of the forgoing references is incorporated by reference in its entirety). Another example of such a prior system is shown in US Patent Application Publication No. US 2018/0260793, entitled "Automatic Assessment of Damage and Repair Costs in Vehicles." This publication purports to disclose a system and method for automatically estimating repair cost for a vehicle, including external damage and inferred internal damage, using image analysis techniques based on images received over a network.

While there are numerous such disclosures in the art, current systems present a number of disadvantages or short comings. Principal among those is lack of accuracy. Without high accuracy in damage detection and analysis, accurate repair estimates are not possible, which dramatically limits the utility of such systems. Illustrations of inadequacy of existing systems in this regard are provided in FIGS. 23 and 24, which present the results of testing of prior technologies by the present Applicant. As will be understood by persons skilled in the art, mean average precision (mAP) is an accepted way to evaluate object detection in machine learning systems. A mAP value approaching 1.0 indicates a high probability of accuracy, however as shown in these plots, most vehicle panels were recognized at an mAP value below 0.500 and for recognition of objects on panel surfaces, some tests provided mAP values of less than 0.2 for everything other than car badges, which are uniquely distinctive. Other problems with existing systems include use of significant computer processing capacity (high computational cost) and inability to determine absolute sizes of areas of damage.

Thus, in spite of recent and significant advances in the fields of image analysis and object recognition, there remains a need in the art for systems that can solve problems of low accuracy, high computational cost and absolute size determinations, among others. The present disclosure provides embodiments that address those problems to meet that need.

SUMMARY

In embodiments disclosed herein, vehicle accident damage is documented by applying machine learning techniques to the problem. An artificial intelligence (AI) application is taught to identify a specific type of vehicle in an image, the orientation and distance to the vehicle relative to the camera and to analyze what body panels are visible in the image. The method further estimates the orientation and severity of the force of impact that caused the damage. If the impact cannot adequately be determined from the images available, embodiments of the method request an observer to acquire further images and directs the observer as to the orientation and field of view of the image/s needed. Associated damage for a given impact is suggested by embodiments of the method so that an observer can collect further image documentation for areas of other anticipated damage on other body panels or components. As more vehicles are assessed by the AI, the information and any corrections to the damage assessment are included into the training set of the machine learning technique which serves to further increase the accuracy of damage prediction using the AI application. The above technique is also applicable to be used on 3D models derived from a multitude of images taken at a variety of angles, from a variety of locations rather than using single or multiple images.

BRIEF DESCRIPTION OF THE DRAWINGS

The application file contains at least one drawing executed in color. Copies of this patent or patent application publication with color drawing(s) will be provided by the Office upon request and payment of the necessary fee. For the purpose of illustration, the drawings show aspects of one or more embodiments of the disclosure. However, it should be understood that the present disclosure is not limited to the precise arrangements and instrumentalities shown in the drawings, wherein:

FIG. 1 is a flow diagram illustrating overall operation of systems according to embodiments disclosed herein.

FIG. 2 is a schematic depiction of an embodiment of an image capture process according to the present disclosure.

FIG. 3 is a flow diagram illustrating a process executed by an image analysis module according to embodiments of the present disclosure.

DETAILED DESCRIPTION

Figure 4:
FIG. 4 shows captured images of vehicles, illustrating an aspect of a vehicle identification process according to embodiments of the present disclosure.

Automated detection of car damage, including determination of damage location and severity, which among other advantages permits more accurate automated estimation of repair or replacement costs, has utility in a wide variety of settings, including, for example, rental car damage assessment; insurance estimation (fast claim assessment); and pricing of used cars. While systems exist that purport to offer some of these advantages, to date commercial implementation of such systems has been limited due to problems such as poor accuracy and high computational cost.

As part of this disclosure, the object recognition machine learning concept is extended to assess the orientation and the force of impact which lead to the identified damage. This assessment, then can be further used to instruct an observer where additional images or photographs should be taken in areas of the vehicle where further damage was likely to occur based on the perceived impact. In addition, it can be specified where close-up images need to be made to fine tune the damage assessment.

Systems Overview

Disclosed embodiments use image recognition and deep learning to detect vehicle body damage, and to predict damage type and extent of damage.

Use cases include manufacturing quality control inspection, second-hand cars, rentals, insurance, repairs, inspection, etc.

Exemplary system features:
  Vehicle Identification
  Vehicle Panel Identification
    More than 50 panels, i.e. bonnet, front right door, back left wheel etc.
  Vehicle Damage Assessment
    Damage Type—8 damage classes, i.e. scratch, scrape, dent, broken etc.
    Damage Size—estimated damage size
  Vehicle Damage Assessment Comparison
  Rules Engine for Repair Recommendation Mobile Application Mobile application runs on all mobile device platforms, such as Android and iOS Facilitates guided vehicle inspections using mobile phone cameras.

The process of using the mobile application can be made simple and frictionless. There are two main tasks, namely
  Application Setup
  Vehicle Inspection Session Application Setup The application setup can be configured according to standard mobile application usage, with the following basic steps:
  Install the application
  Login to the application
  Allow permissions requested
  Start a New Session Vehicle Inspection Session A vehicle inspection session preferable comprises eight images taken around a vehicle, but may comprise less The process is as follows
  Start a New Session
  Choose Manual Mode or Automatic Mode Automatic Mode identifies the vehicle and the vehicle side and takes an image automatically Manual Mode allows the user to control exactly when the image is for a particular vehicle side Complete vehicle inspection session Send session up to sever be evaluated A system management portal allows users to view Vehicle Inspection Sessions.

In the portal users can see the details of the vehicle inspection, and the damages found.

Using a combination of image recognition, deep learning, and expert rules, disclosed systems and methods automatically assess and estimate damage to vehicles and to give recommendations based on the type of vehicle, vehicle panel, type of damage, and extent of damage. In one embodiment, as shown in FIG. 1, a methodology followed for automated vehicle accident detection with system 10 comprises image capture module 12, image analysis module 14, damage size determination module 16, vehicle model generation module 18, expert rules module 20 and report generation module 22.

As shown in FIG. 2, image capture module 12 may include one or more fixed cameras 24 at a vehicle image generation studio, such images may be transmitted through a network via computing device 28 to image analysis module 14. Alternatively, image capture module may be executed in the form of a mobile application running on a mobile device such as a smart phone or tablet. In some embodiments, it is desirable to take a number of pictures at different angles around the perimeter of the vehicle. For example, an image generation studio, the image capture software may be programed to take eight images, each spaced 45° from view angle of the preceding image. A fixed installation with multiple image capture devices can very precisely position the images captured. In a mobile application embodiment, the user may be prompted to take a series of images spaced around the vehicle. The user can be alerted and prompted to take a new image if one image is spaced at a sufficiently different angle of view from a preceding image. While eight images spaced at least approximately apart by 45° view angles may be ideal, the systems and methods disclosed herein are robust and do not require such precision or multiplicity of views to produce useful results. In some embodiments, as few as just two images focused on a specific area of damage from different angles may suffice. In other embodiments, four or six images of different areas of the vehicle as viewed from different angles may be used.

FIG. 3 show an embodiment of sub-modules suitable for executing the processes of image analysis module 14. Image analysis module 14 uses deep learning AI models for analyzing images taken around a vehicle, using, in some embodiments vehicle identification sub-module 30, make and model determination sub-module 32, vehicle determination sub-module 34, vehicle orientation determination sub-module 36, vehicle panel identification sub-module 38 and damage identification sub-module 40. In some embodiments, as illustrated in FIG. 4, vehicle identification sub-module 30 may utilize conventional image analysis-based object identification techniques to determine the presence of a vehicle within presented images. If a bounding box cannot be established or a vehicle not identified within the image, the user may be prompted through a system UI to provide additional or alternative images.

When a vehicle is identified, the process flow moves to make and model determination sub-module 32 to identify the type of vehicle that is in the image(s). This step may provide or utilize vehicle metadata such as make, model, color, vehicle type. At least two different methodologies may be employed separately or in combination in this sub-module: object recognition techniques to identify vehicle badges and model designations on the vehicle, and/or pattern recognition techniques comparing vehicle profiles or designated features to a vehicle model database kept in a storage accessible by make and model determination sub-module 32.

In some embodiments, vehicle registration determination sub-module 34 first identifies if there is a license plate visible on the vehicle in the image. Alternatively, in other embodiments, this sub-module may additionally or alternately identify presence of a VIN in a captured image. If there is a license plate or VIN visible, the vehicle registration is identified and vehicle data can be retrieved from a networked registration database. Vehicle registration determination sub-module 34 may run after, before, or in parallel with sub-module 32. Results of sub-modules 32 and 34 also be used as checks against one another to increase confidence in model and registration determination accuracy.

Figure 5:
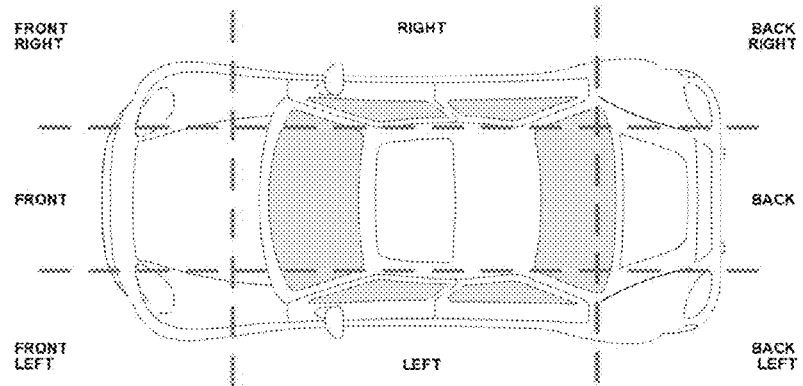
FIG. 5 is a schematic depiction of a vehicle illustrating an aspect of a vehicle orientation determination process according to embodiments of the present disclosure.

Orientation determination sub-module 36 identifies the orientation of the vehicle in the image(s), which identifies the part of the vehicle that is visible in the image. As shown in FIG. 5, in some embodiments, the orientations include Front, Back, Left, Right, Front Left, Front Right, Back Left and Back Right. In some embodiments, orientation determination may be based on edge detection using CNN (convolution neural network) techniques. Alternatively, two types of CNN may be employed: edge detection and object recognition, in which case sub-module 36 may run together or in parallel with vehicle panel identification sub-module 38 with object recognition of vehicle panels used to augment edge detection techniques. For example, edge detection may be used to detect a sun roof within a detected roof panel.

Figure 6:
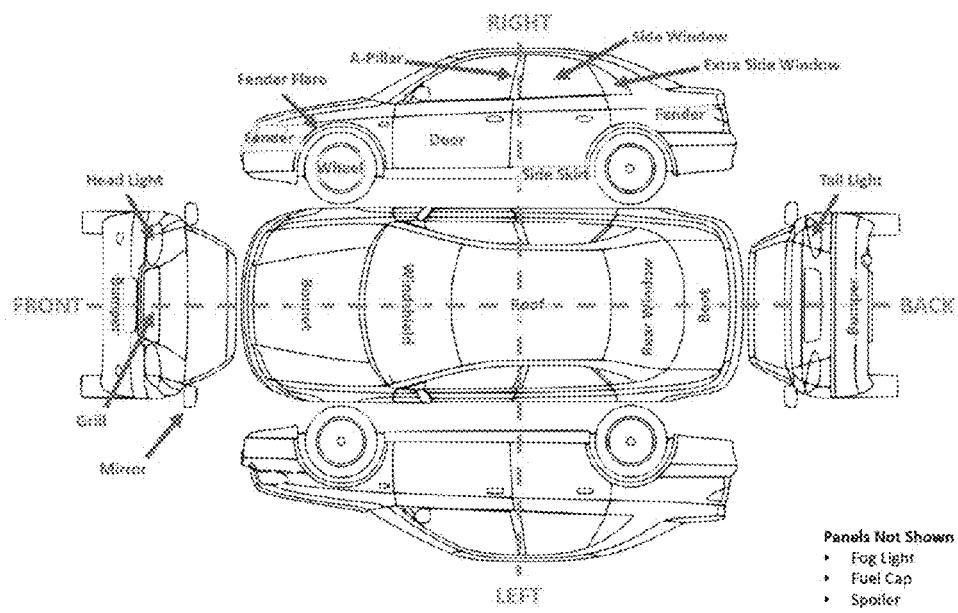
FIG. 6 is a schematic depiction of a vehicle illustrating an aspect of a vehicle panel identification process according to embodiments of the present disclosure.

Vehicle Panel Identification sub-module 38 identifies the panels of the vehicle visible in the image. As illustrated in FIG. 6, more than 50 panels around the vehicle may be identified, including, for example, the bonnet, the front right door, the back left wheel, etc. In some embodiments, panel identification may being with edge identification based on the prior sub-module. With edges identified, a starting edge may be selected according to a rule-set and then by moving across the image identifying edges based on the rules, panels may be identified. In one embodiment, three parameters may be considered in parallel: edges distinguishing panels, panels indicating expected next edges and location analysis. In some embodiments, all three factors are compared and must match, or alternatively a best match is selected. In such embodiments, multiple analyses may be performed: geometric analysis for edge detection. locational analysis, which is rule based and provides an orientation result, and image analysis employing CNN object recognition or other object recognition mode. A further factor of topological relations may be used to consider how spaces relate to other spaces.

Figure 7:
FIG. 7 shows captured images of vehicles, illustrating an aspect of a vehicle damage detection and classification process according to embodiments of the present disclosure.

Once vehicle panels are identified, vehicle damage identification sub-module 40 identifies the damage on the vehicle in the image. This step identifies the damage class of the damage and the damage extent using image analysis techniques as illustrated in FIG. 7. Damage class is the type of damage identified. In some embodiments there are at least eight damage classes, which may include, for example, alignment, scratch, scrape, dent, chip, rim damage, broken window, broken light. Damage extent is an estimate of the severity of the damage, which may be calculated as a percentage of the panel area that includes identified damage areas. Alternatively, damage dxtent may include two different components: the percentage of panel affected and depth of damage in the affected areas. Depth of damage estimates a magnitude of distortion of affected panels using deformational analysis based on comparison of plane differentials and image particle analysis. Depth of damage information provides greater detail and accuracy to damage estimates as compared to percentage of area information alone.

Current technology for automated damage assessment typically uses instance segmentation to identify damages as objects in images. In embodiments of the present disclosure, preferred systems use a combination of instance segmentation and sematic segmentation. This approach yields more precise predictions, as well being more computationally efficient in production image processing.

Figure 8:
FIG. 8 shows captured images of a vehicle, illustrating an aspect of a damage size estimation process according to embodiments of the present disclosure.

Returning to FIG. 1, and with reference also to FIG. 8, damage size estimation module 16 uses homography and allometry to calculate absolute size of damage detected. While an estimated extent of damage, as described in the preceding paragraph, provides useful information for damage/repair cost estimates; absolute damage size provides much more accurate information on which cost estimates may be based. Thus, in embodiments employing damage size estimation module 16, this module is an important factor in further increased accuracy of such embodiments. Homography relates the transformation between two planes and planar surface viewed from two camera positions. In one aspect, homography provides an angle of view for vehicles identified in processed images. Allometry relates to using the sizes of known vehicle elements to calculate the size on unknown vehicle elements. Knowing the angle of view, allometric techniques allow calculation of size of unknown objects in processed images by comparison to known object sizes stored in a network connected object size database. Combined, allometry and homography are used to calculate the size of damage on panels at different camera angles allowing for improved accuracy in damage estimates as compared to prior techniques.

Figure 11:
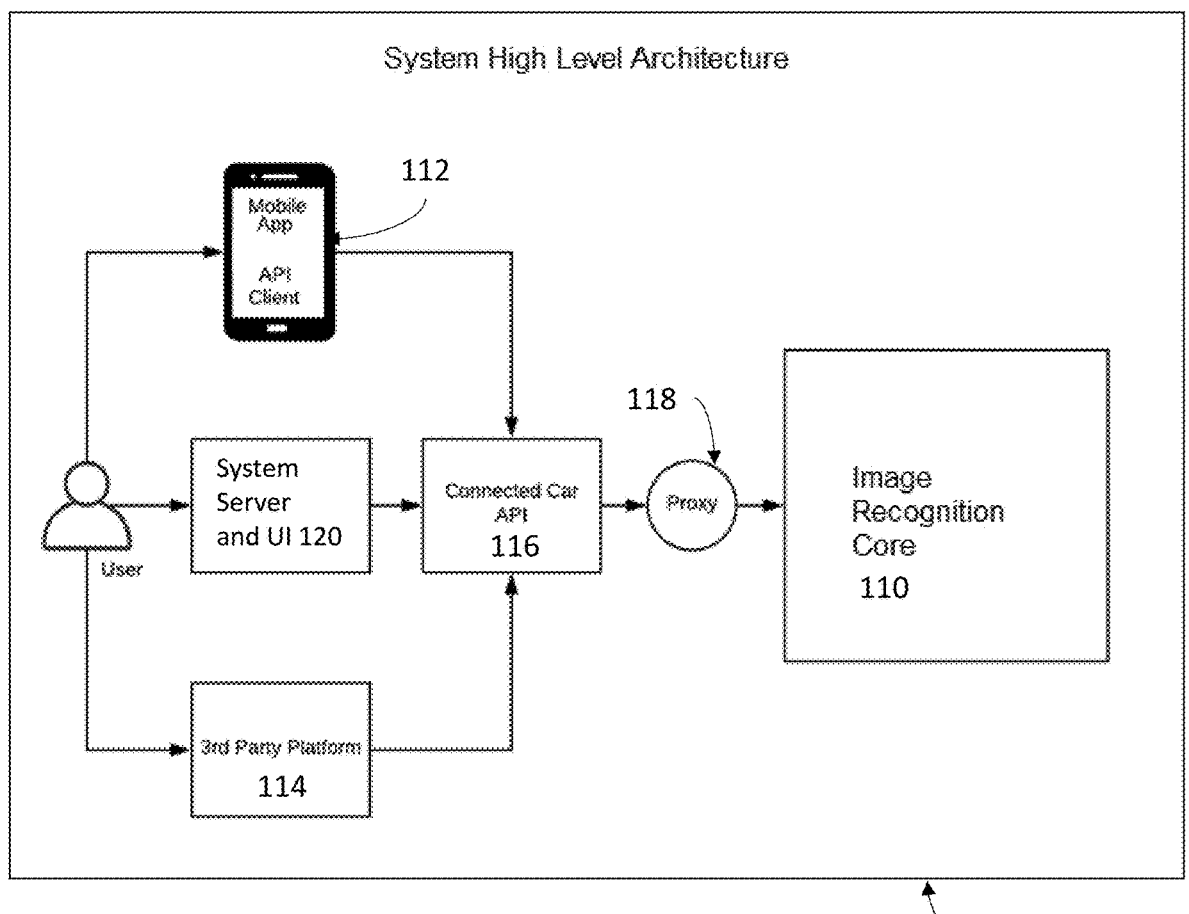
FIG. 11 is a block diagram depicting a high level system architecture according to an embodiment of the present disclosure.

Allometry enables the calculation of the size of elements in an image based on known sizes and dimensions in vehicle. In some embodiments the following elements with known sizes are used: License Plate, Wheelbase Length and Wheel Size. Given a known vehicle type the appropriate elements are identified. Their size is taken from known vehicle metadata or estimated based on vehicle type. Necessary data may be stored in databases accessible to the image recognition core 110 (FIG. 11). The size of these elements are used to calculate the size of neighboring elements in an image Homography facilitates consolidation and comparison of damages detected on panels between different orientation images. Sizes of panels and damages calculated in one orientation are applied to the second related orientations. For example, sizes calculated on the side orientations are projected on the diagonal orientations. Homography enables model output cross comparison and validation between images. Vehicle orientation detection in the image analysis step is used to determine the appropriate homographic projections.

In some embodiments, damage size may be estimated using one or both of the two approaches. In a first approach, when a damage estimation session has eight valid images uploaded, homography between two image pairs will be calculated and applied to damage polygons on each angle view. In a second approach, when an angle view not have corresponding side view such that homography calculation is not possible, a predefined homography for given projection will be used. In certain embodiments the second approach may be used as a fallback when first approach fails.

In the first approach, damage size estimation begins by initiating a new session task in a system imaging core (see, e.g., FIGS. 11 and 12), which will be performed by damage size determination module 16 (FIG. 1). In one embodiment, damage size determination module calculates homography for each of the eight projections using automatic point selection and uses the resulting matrices to calculate damage polygon areas. In a next step, an algorithm for damage size estimation based on the license plate and wheelbase length is used. Suitable algorithms for this purpose may be formulated by persons of ordinary skill based on the teachings contained herein.

Figure 8A:
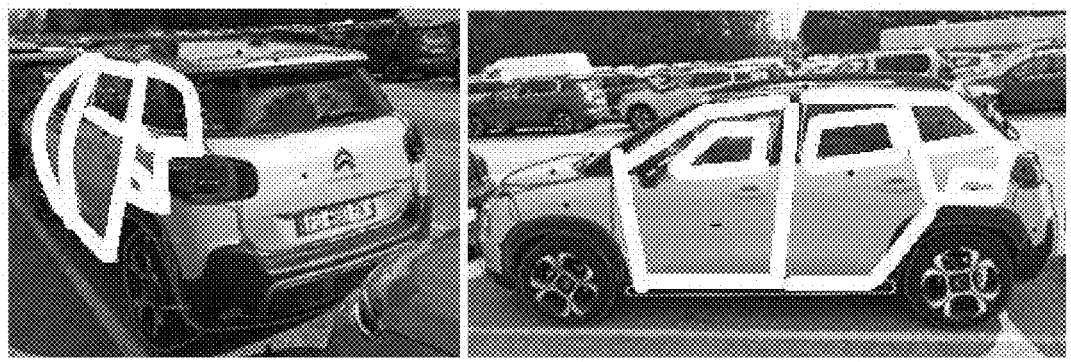
FIG. 8A shows a detail of views A and B in FIG. 8.

In one embodiment, the eight projections may be categorized as: Back-left→left; Back-left→back; Front-left→left; Front-left→front; Back-right→right; Back-right→back; Front-right→right; and Front-right→front. In this example, all car panels may be divided in two classes: those that do not change visible geometry when viewed from an angle (green class), and those that do change (red class). Green class and red class refer to the panel outline colors employed in one working example of the present invention when displayed in the UI in color. Examples in a back-left→left projection are shown in FIG. 8 (views A and B), wherein the green class panels include the front and back doors and the side panel surrounding the gas cap cover, with substantially the remainder of the visible vehicle panel area comprising red class panels. (Note that in the event that color reproduction is not provided for publications of this application or that the resolution is insufficient in published versions, FIG. 8A presents a gross simplification of views A and B of FIG. 8 in which the green class panels are outlined with thick white lines to facilitate identification. As will be appreciated by persons of ordinary skill this is only an approximation for purpose of facilitating understanding of this disclosure. Also, it will be appreciated that the choice of red and green colors is arbitrary based primarily on user preference and may be selectable in specific user applications).

In this example, precision of the damage estimation algorithm is anticipated to be increased for damage identified on the green class panels. Precision of the damage estimation algorithm is anticipated to be variable for damage identified on red class panels and may depend on which part of the panel the damage is located.

For each of the four angled views, two lists of panels will be created that will be used to determine which side view the damage on the panel should be projected to. For example, in the back-left view (see FIG. 8, view A) both back-left doors and boot are visible, but the back-left door should be projected to left view and boot should be projected to the back view (FIG. 8, view E). Some of the panels (e.g., taillights, rear bumper) may not appear on either list (no damage estimation will be done) or will be in two lists simultaneously (each damage will have two size estimations). For these panels identifying averaging or best fit techniques may be used to finalize damage size estimations.

In the second approach, for each projection a predefined homography matrix may be used as mentioned above. In some embodiments, the predefined homography matrix can be calculated based on a large number of sample sessions and images. In one example, to give an idea of scale, a predefined homography matrix is calculated using 108 sessions with 864 images. An example of a homography matrix is shown in Table 1 below.

TABLE 1

Example of Homography Matrix

{0.002159603359, 0.000370248438, −0.970293019982}
{0.000244832081, 0.000873672235, −0.241921047967}
{0.000000804313, −0.000000008391, 0.000194182679}

Further, for each projection, a pair of angle-side images will be identified using orientation detection results. Additional pairs of angle-side images may be added using manual search. For each pair of images. homography will be calculated using either automatic point detection or manual point selection (practice has shown that in many examples manual point selection can improve homography precision by several factors). When using automatic point detection, improvement of point selection algorithm may be considered (such algorithm can also be useful during implementation of the first approach described above). Also with automatic point detection, additional homography optimization may be considered (again, practice has indicated that manual tweaking of homography values can improve homography precision by at least a factor of 2). Next, all calculated homographies for a given projection are averaged to produce one homography matrix. Eight such homography matrices are calculated, i.e., one for each projection.

Precision of two different homographies for any given projection can be compared using panels from the green class as a reference. When applying homography to a panel from the green class in the angled view a projected panel polygon is computed, and its area is compared with the same panel area in the side view. The delta between these two polygons areas is homography error. The lower this error is, more precise the homography. Average error and maximum error over all panels in the green class also can be computed. Example—Second Approach to Damage Size Estimation. See FIG. 8B.

Figure 8B:
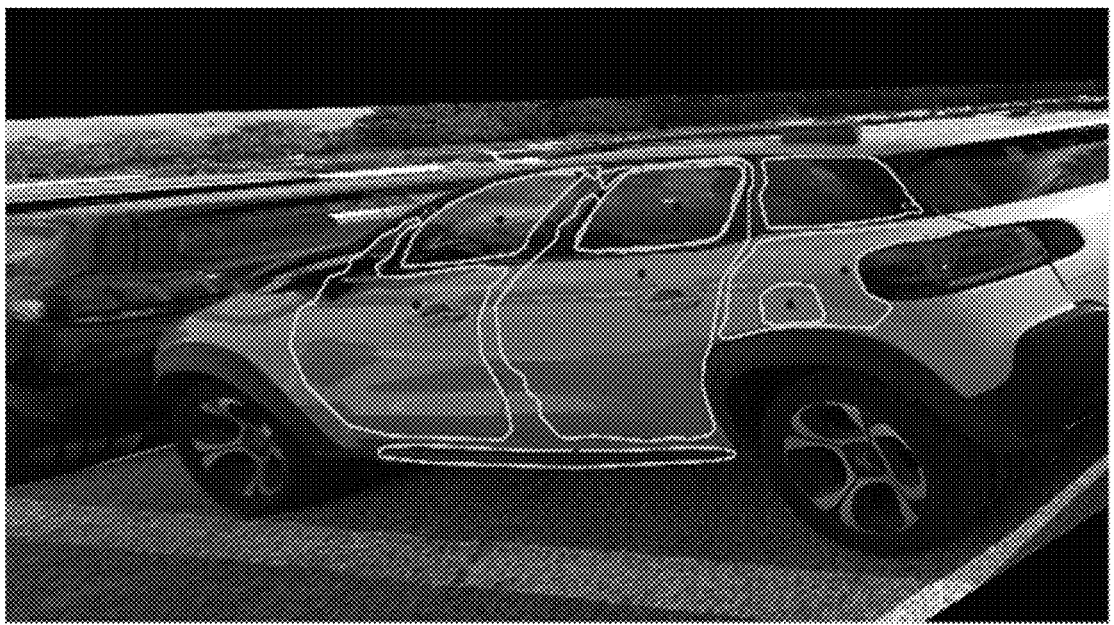
FIG. 8B illustrates a working example of a second approach to damage size estimation utilizing homography according to embodiments of the present disclosure.

In this example, nine sessions are identified with back-left→left image pairs. Using one session pair, automatic point selection (center of wheels, fuel cap and front side window) gives 72% max error and 44% average error over eight panels in the green class. By comparison, manual point selection gives 41% max error and 21% average error (point selections indicated by white dots within green class panels shown in the upper image of FIG. 8B). Applying computed homography to the eight other sessions gives max error ranging from 26% to 104% and average error ranging from 14% to 60%. FIG. 8B also shows the homography matrix and computed error for the manual point selection mode of this example.

It will be noted by persons of ordinary skill that in preferred embodiments described herein, damage estimation, both damage extent and damages size, is performed on 2D images as provided by image capture and processed in steps prior to damage estimation on top of a 3D model. This provides significant advantages in terms of accuracy and reduced computing cost, thus addressing common problems in prior systems, many of which require superposition of damage representations from the 2D image capture onto 3D image models in order to perform damage estimation functions.

Figure 9A:
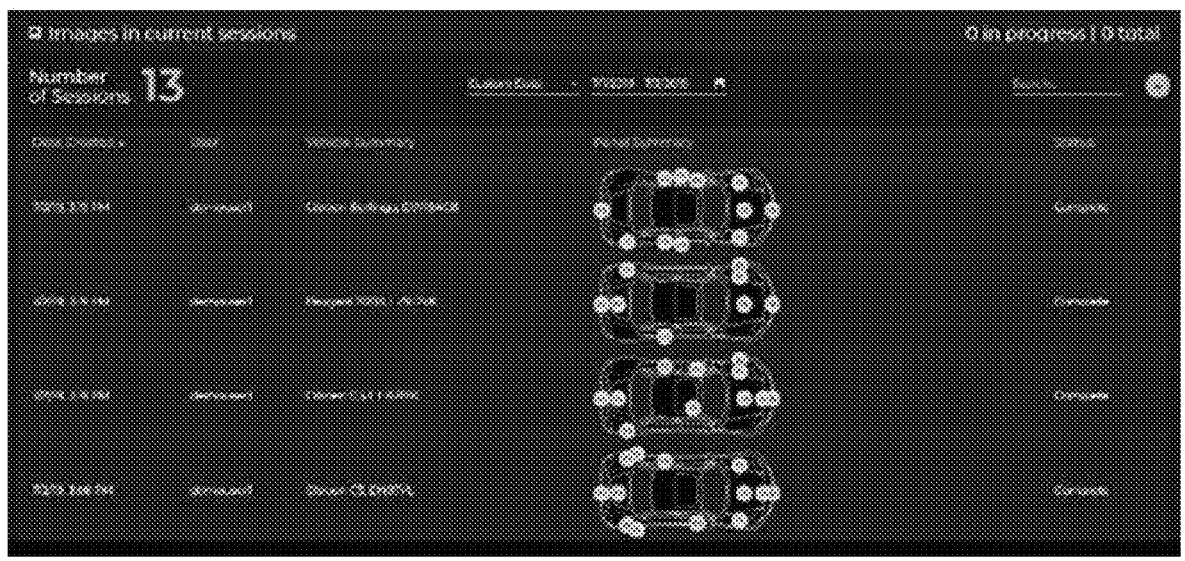
FIGS. 9A, 9B and 9C are show views of a user interface illustrating vehicle model creation and a damage report according to embodiments of the present disclosure.
Figure 9B:

360° vehicle model generation module 18, generates a 3D model of the vehicle with previously identified areas of damage overlaid thereon. Module 18 is primarily a user interface module, as shown in FIGS. 9A and 9B, which facilitates human interaction with the damage estimate. Module 18 is therefore optional and typically would not be required for fully automated systems that did not require human interaction in order to validate or approve estimates or generated reports or, for example, insurance claim approvals. In some embodiments, 3D models may be retrieved from a database based on vehicle identification information determined in preceding steps. Alternatively, 3D models may be generated based on processed images input to the system by the user. FIG. 9A presents a screen of a user interface as may be used by a system manager. FIG. 9B presents a screen of a user interface that may be used by both an end user or a system manager. Note again that it is preferred that damage size estimation be executed on 2D images prior to creation of 3D model to increase accuracy and reduce computational cost In order to generate accurate repair cost estimates expert rules module 20 ties the image capture, image analysis, 360 vehicle model creation, and damage size estimation together for the purposes of being able to estimate the cost of repair. Vehicle make and model, combined with repair recommendation facilitate estimation of the cost of repair. In some embodiments, examples of use cases may include vehicle refurbishment and/or vehicle auction.

In the use case where vehicles are being automatically assessed for refurbishment. expert rules are created and applied to identify repair recommendations based on vehicle make and model, and determined parameters such as panel damaged, damage type, and damage extent and/or size. For example, if the vehicle is a panel van, and the right front door has a damage type of dent that is less than 3% of the panel surface or less than 10 cm 2 then do a smart repair.

In the use case where vehicles are being automatically assessed for classification in vehicle auctions, expert rules are and applied created to identify the auction category of the vehicle based on the vehicle make and model, and determined parameters such as panel damaged, damage type, and damage extent and/or size. For example, if the vehicle has any panel that is damaged by more than 50% regardless of damage type then the vehicle is classed as a Category C vehicle, i.e. a repairable salvage vehicle.

Figure 9C:
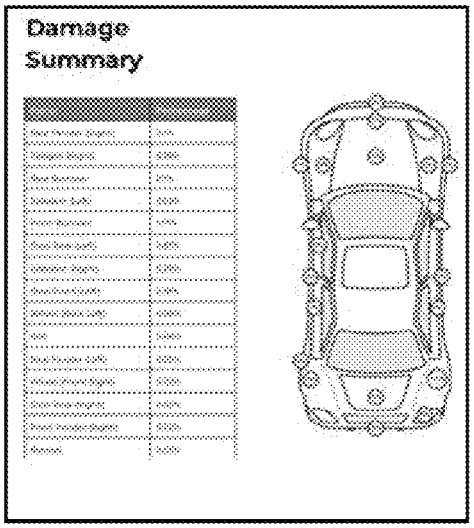

Report generation module 22 provides comprehensive vehicle damage reporting combining outputs of image capture, image analysis, 360 vehicle model creation, damage size estimation, and rules system. The reporting may span the entire vehicle lifecycle providing single instance reporting as well as comparative temporal reporting expanding use cases to before-and-after scenarios for insurance, vehicle rental, ride sharing, and vehicle leasing. An example of a portion of a damage report as presented in a user interface is shown in FIG. 9C.

Figure 10:
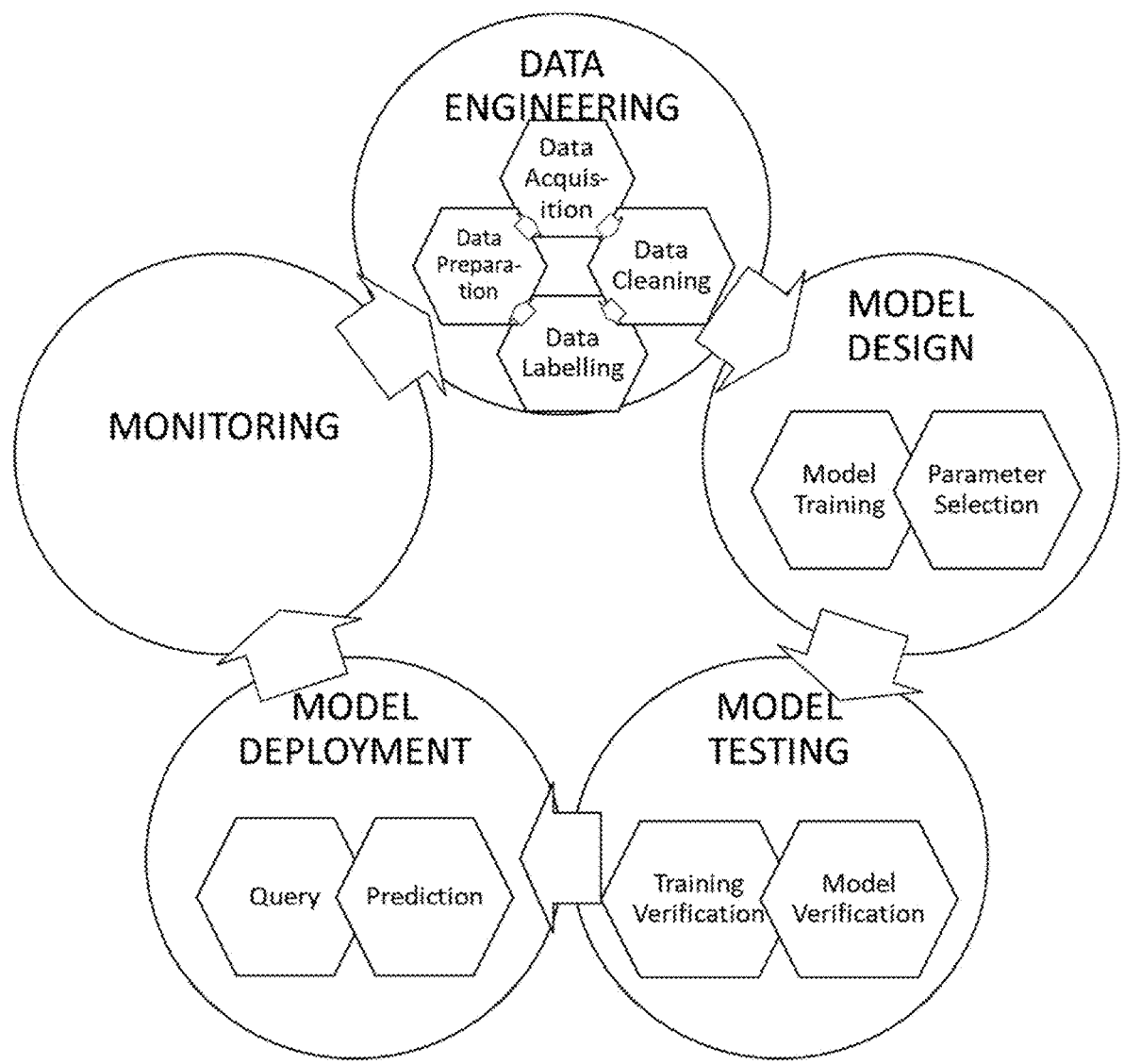
FIG. 10 is a flow diagram illustrating a model training and usage life-cycle according to an embodiment of the present disclosure.
Figure 15:
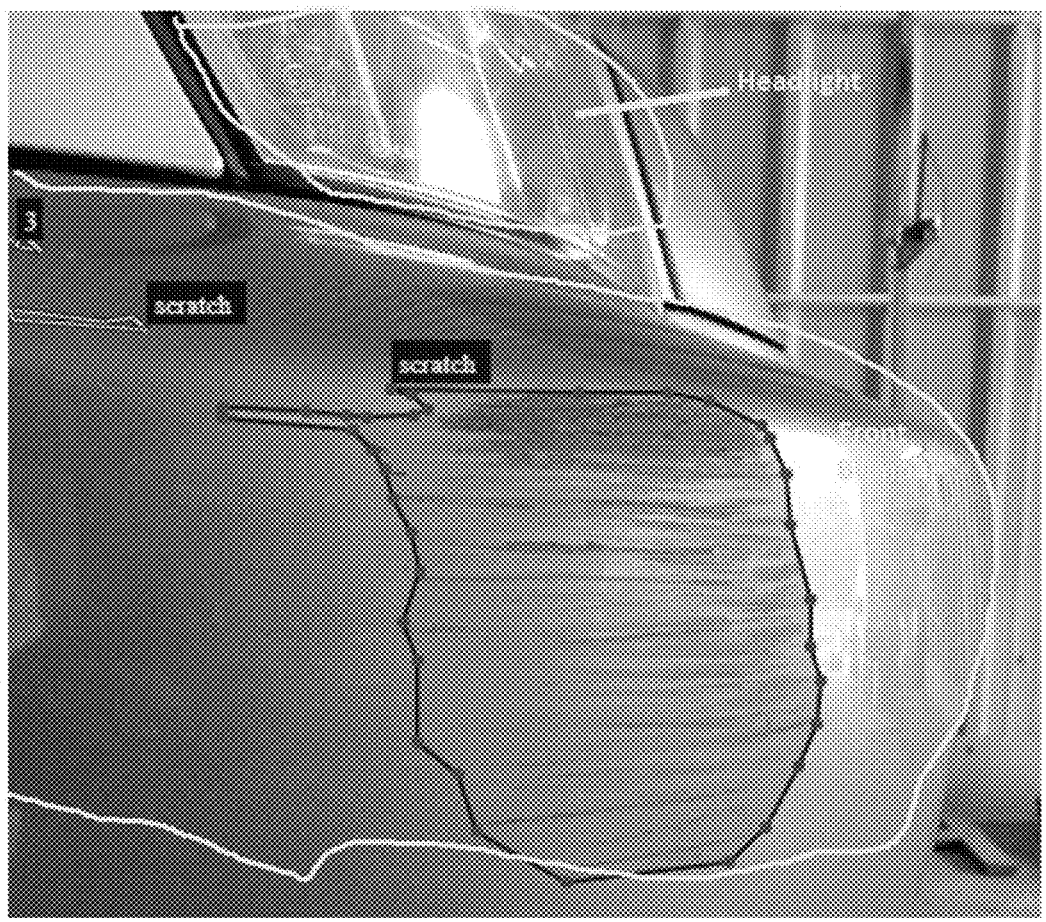
FIG. 15 illustrates and example of a training step for training the system to identify damage and location of damage using an image of a right front bumper with a scuff and some scratches.

In various embodiments disclosed herein, computer vision models used in vehicle identification, make and model identification, registration/license plate identification, vehicle orientation identification, vehicle panel identification, and vehicle damage identification range from classification and localization models to semantic and instance segmentation models. Such models are created, trained, tested, and deployed in a machine learning lifecycle, an embodiment of which is illustrated in FIG. 10. As illustrated therein, an exemplary machine learning lifecycle for disclosed embodiments may start with data acquisition, coming full circle with production deployment and monitoring. One example of model training is illustrated in FIG. 15.

Figure 12:
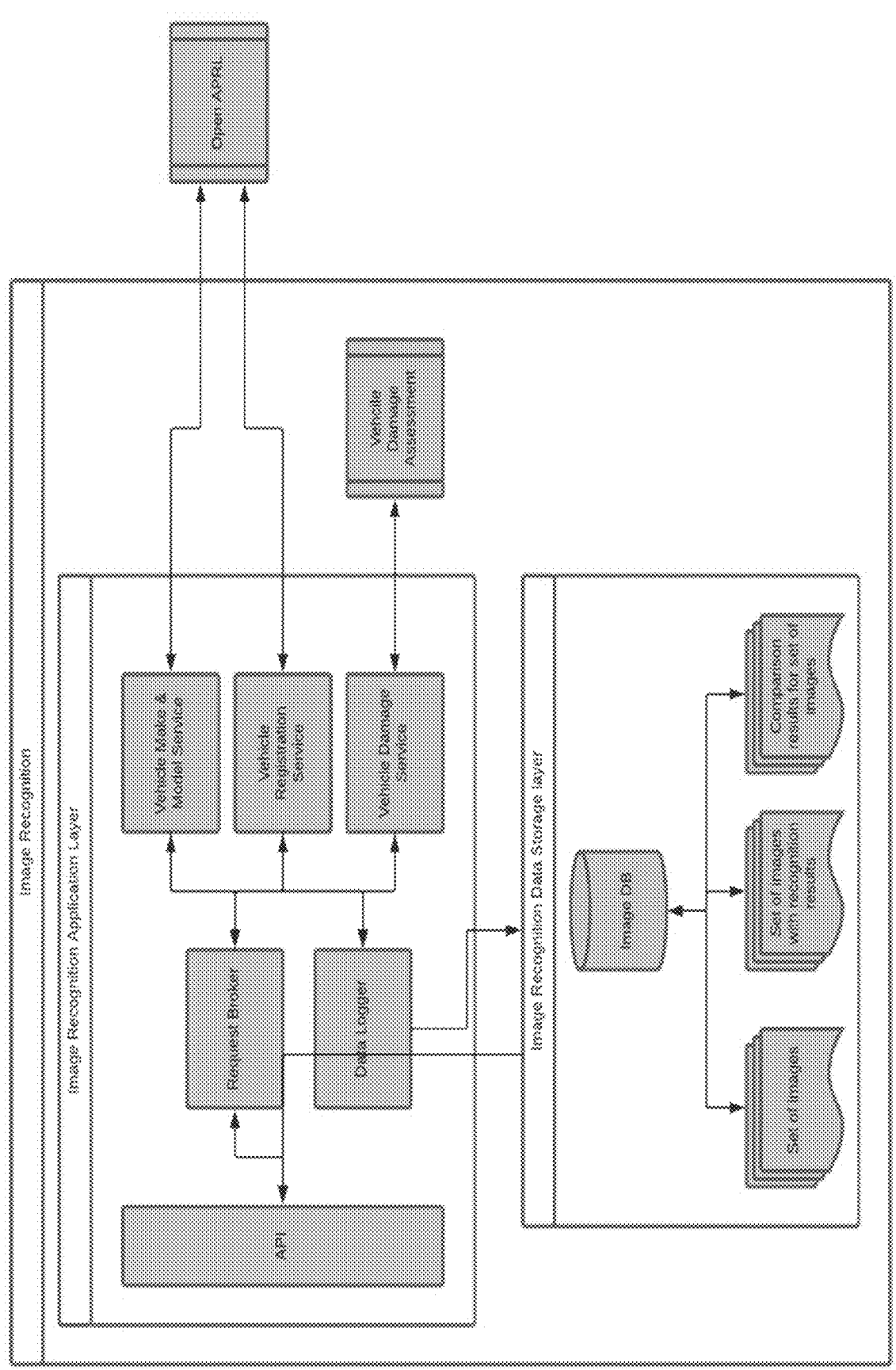
FIG. 12 is a block diagram depicting a high level architecture of an image recognition core module according to an embodiment of the present disclosure.
Figure 22:
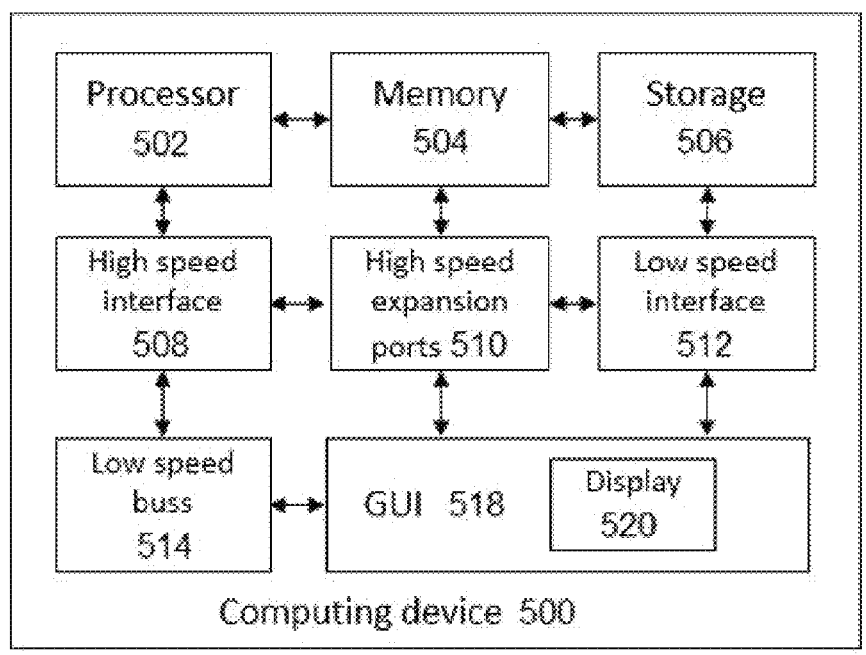
FIG. 22 is a block diagram of a specialized computing device according to one embodiment of the present disclosure.
Figure 20A:
FIGS. 20A, 20B, 20C, 20D, 20E, 20F, and 20G are screen shots depicting user interfaces of applications configured in accordance with embodiments of the present disclosure.
Figure 20B:
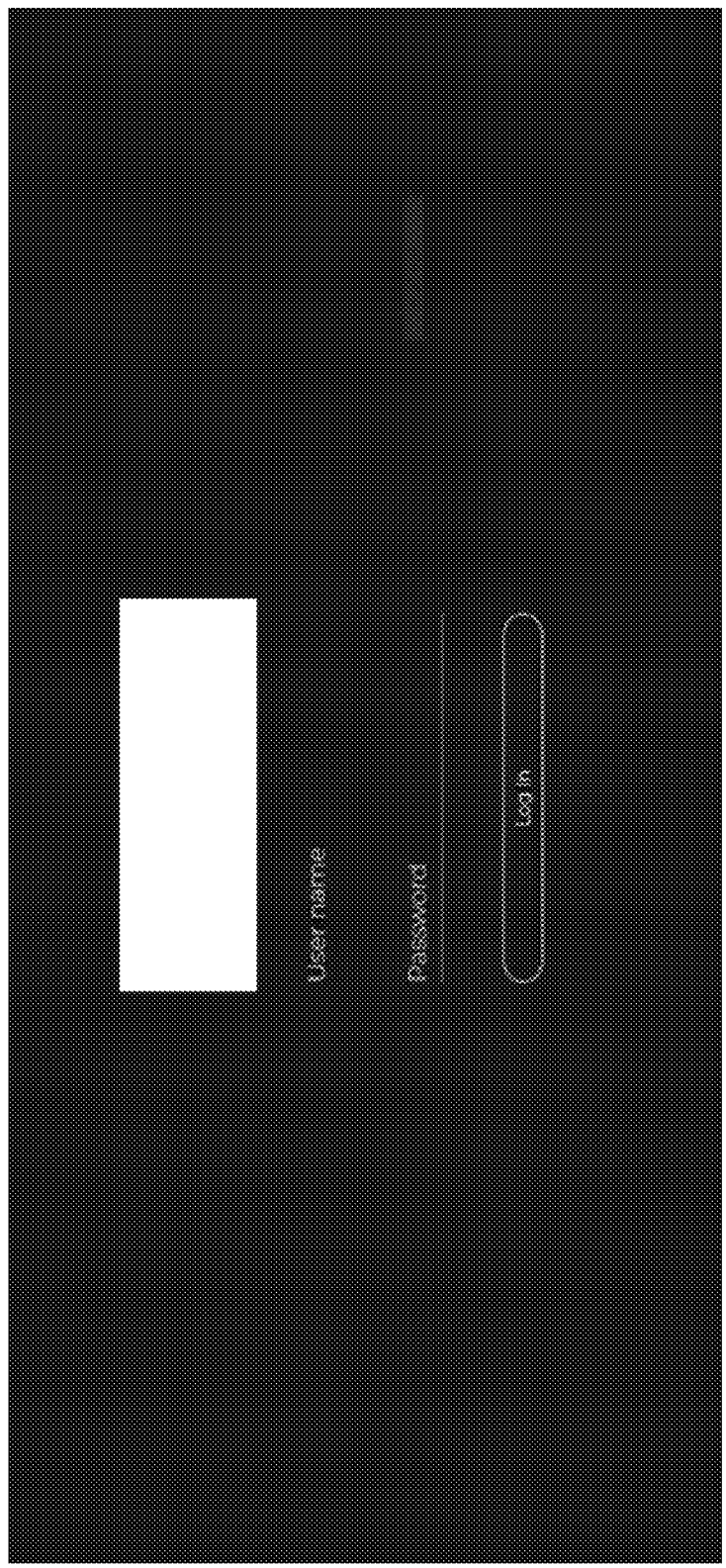
Figure 20C:
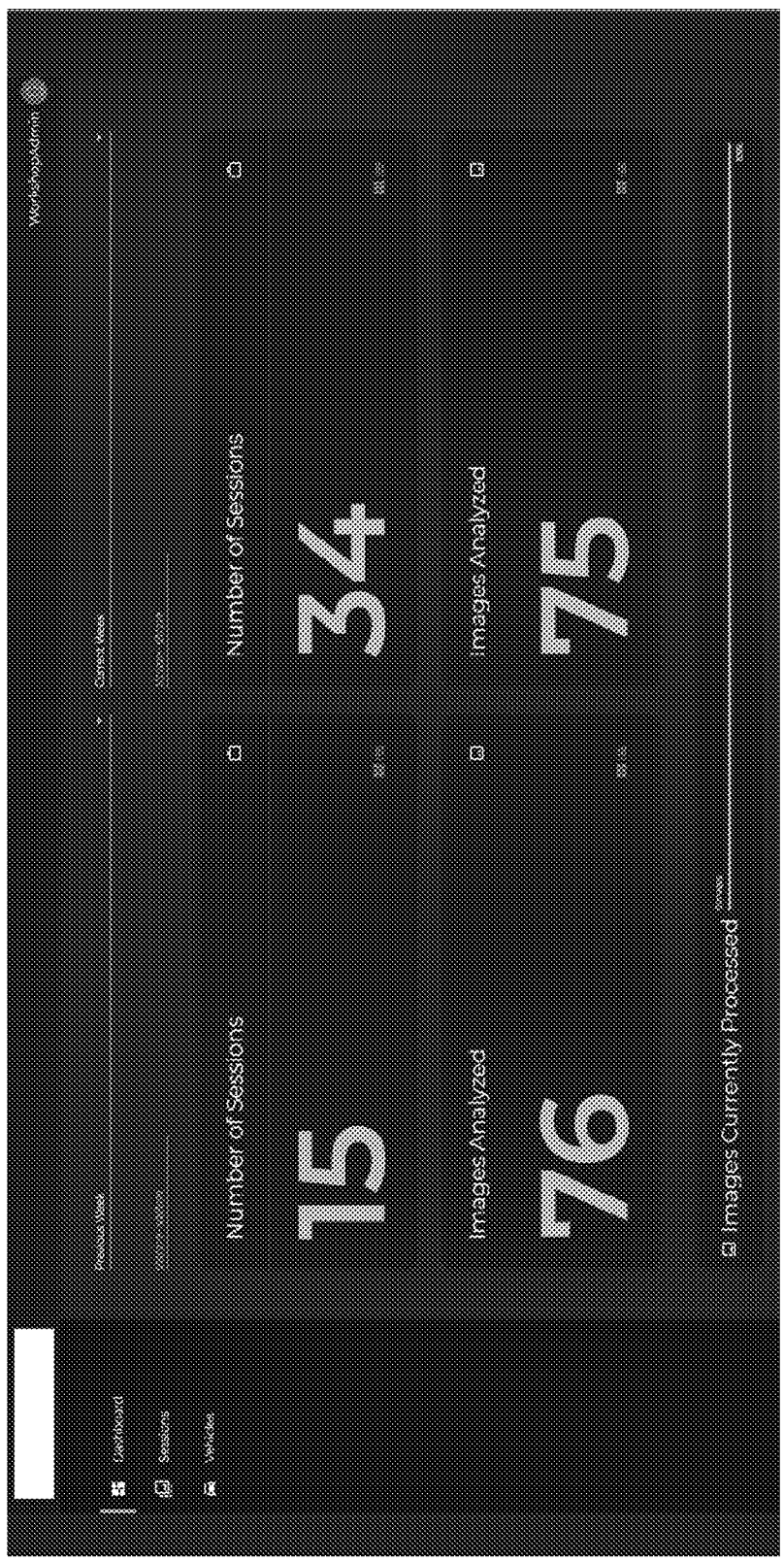
Figure 20D:
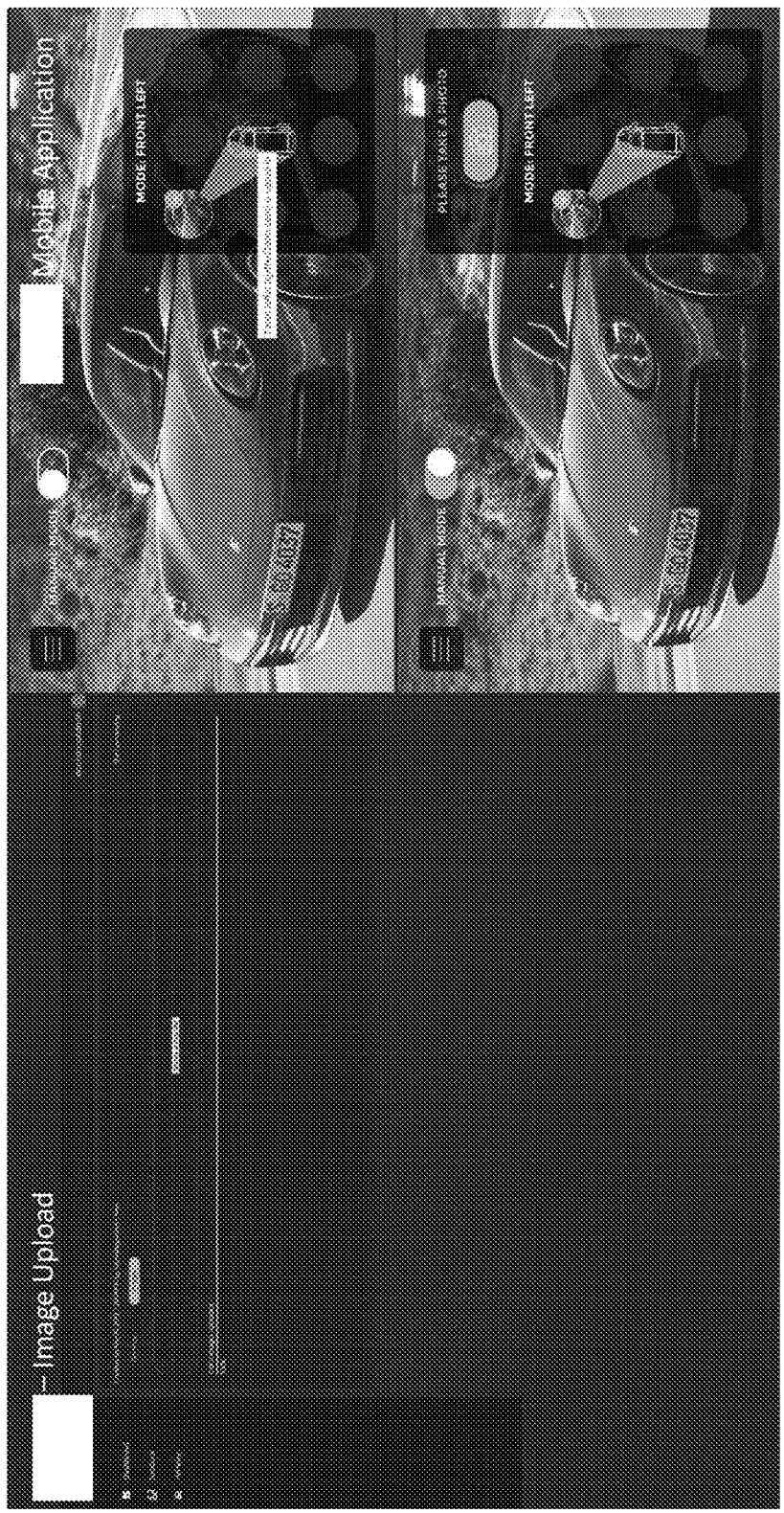
Figure 20E:
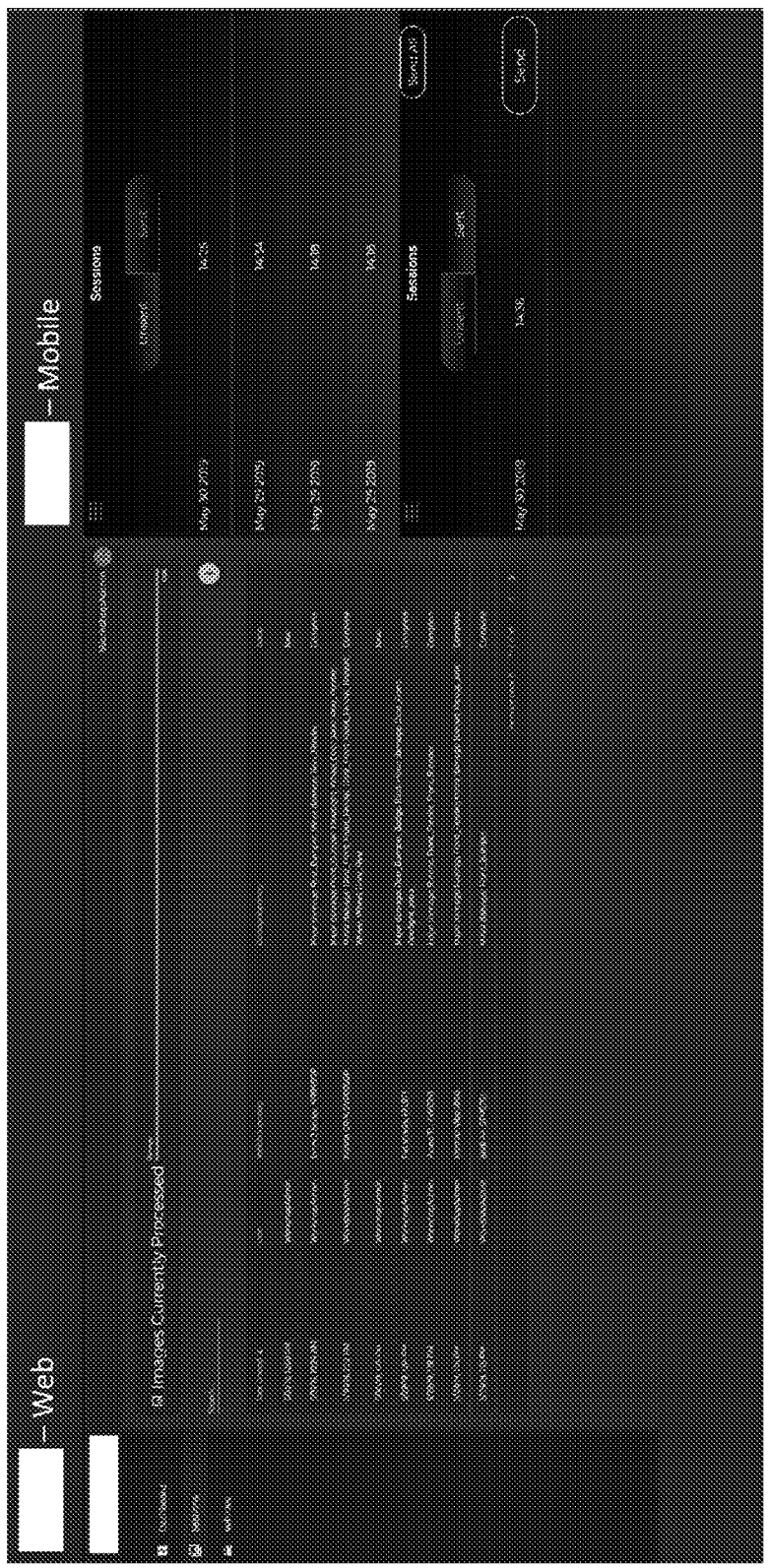
Figure 20F:
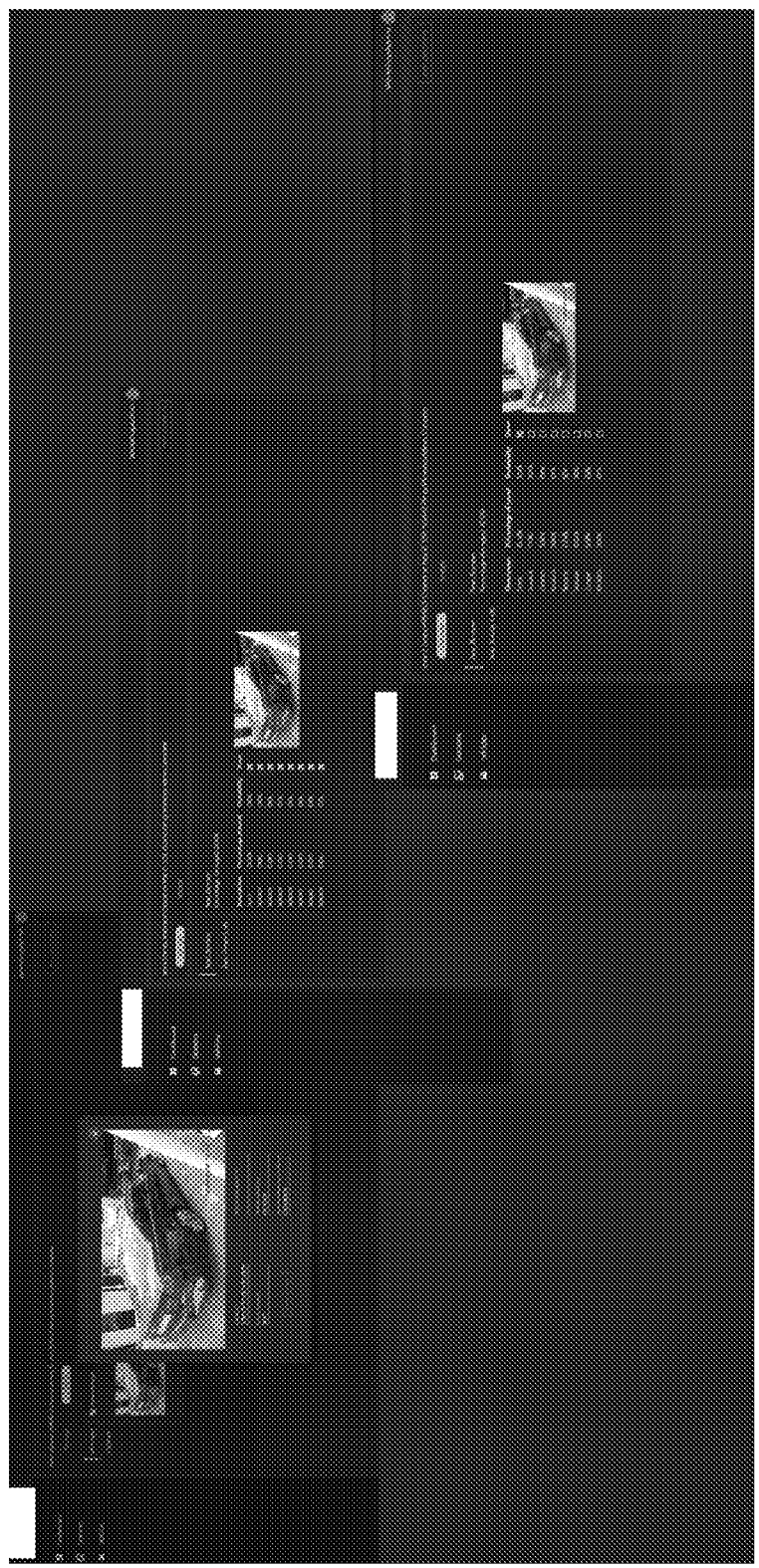
Figure 20G:

High level components of an exemplary system 10 in accordance with embodiments disclosed herein is shown in FIG. 11. Image recognition core 110 may comprise one or more computing devices configured, for example, as shown in FIG. 22 below, which may be integrated or cooperate as a networked system. In some embodiments, image recognition core 110 contains, in particular, image analysis module 14 and damage size determination module 16. Mobile app 112 and/or 3$^{rd}$ party platform 114 may contain image capture module 12, communicating via API 116 and proxy 118. System server and UI 120 also may be configured as one or more computing devices and contain vehicle model generation FIG. 12 shows details of one implementation of image recognition core 110 in accordance with embodiments of the present disclosure.

Figure 13:
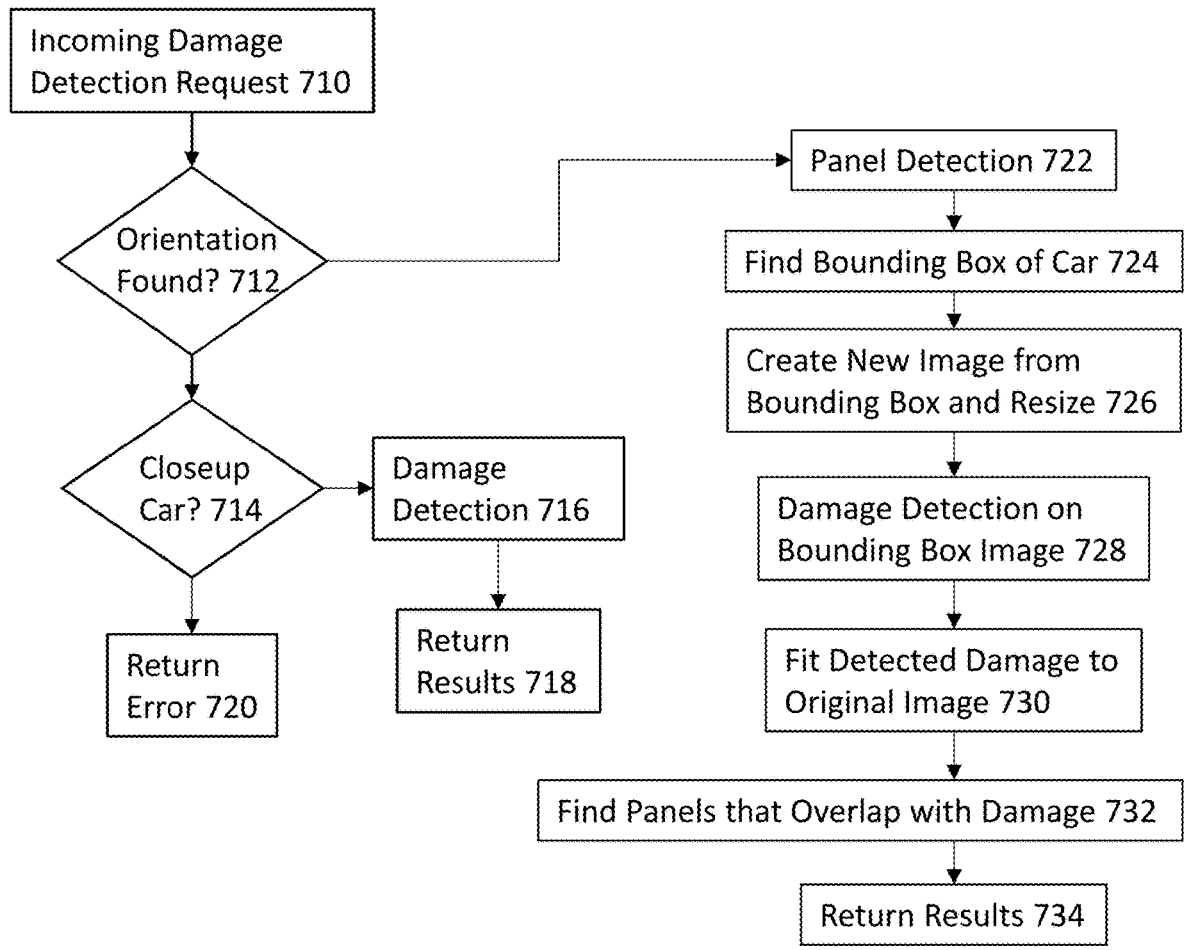
FIG. 13 is a flow diagram illustrating an alternative example of a damage determination API embodiment of the present disclosure.
Figure 14:
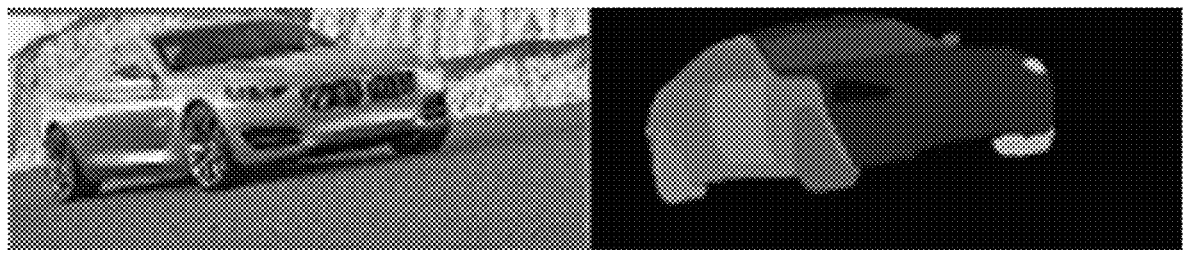
FIG. 14 illustrates an example of panelization or segmentation of an image of a car according to alternative embodiments described herein.

FIG. 13 presents an alternative embodiment of a process flow for identifying damage and estimating damage using R-CNN object recognition techniques as disclosed herein.

Alternative Embodiments

Outline: Creating an Artificial Intelligence Vehicle Damage Model and User Application
 Train an AI to recognize the type and model of a vehicle in an image along with the orientation of the vehicle in the image and the scale of the vehicle in the image
  Obtain or create a 3D model of each vehicle (make and model) of interest
  Identify panels or components of the vehicle in the model
  Acquire and associate images of an undamaged vehicle to the 3D model and/or create the 3D model from the images.
 Train the AI to recognize types and severity of damage associated with all panels or components of a vehicle of interest.
  Acquire images of damage along with information that describes the damage.
   Damage type
   Vehicle component damage is on
   Force and Direction of the image (relative to the vehicle)
   Direction to look for other damage.
   Other components that might have sustained damage based the component, type and severity of the identified damage
  Orient damage images relative to the 3D model for the undamaged vehicle
 Application Interface
  Vehicle is damaged
  Observer takes picture of the damage/submit to application
  Application determines whether it can identify the vehicle in the image
   Yes: Proceed
   No: Request one of more images showing more of the vehicle or make and model of vehicle or VIN number
  Application identifies the vehicle and further identifies the panels or components that are visible by comparing a 3D model of the vehicle projected into the 2D space of the image/s and varying the scale and orientation of the 3D model until there is a match between the projection of the 3D model and the 2D image frame.
  Application compares the image/s of the damaged vehicle with the image model in the AI and finds damage including the size and extent.
  Application determines estimated force vector for the damage impact.
  Application suggested where additional damaged associated with the force vector may be located on the vehicle based on the knowledge base in the AI.
  Observer takes additional images.
  Application determines the extent of damage and reports
 Post Processing
  Operator manually updates the results of a vehicle damage prediction and feeds the image/s and analysis back into a new training set for the AI.
  A new model is generated.

A machine has to be taught not only what an undamaged vehicle looks like, but the size and shape of the vehicle as well. What damage looks like also has to be learned.

An artificial intelligence methods can be continually trained to perform increasingly accurate object recognition by adding additional images with descriptions of what is in the images. Estimates of force and direction of an impact coupled with information concerning the type of damage and relative location of the damage along with associated damage in other areas of the vehicle, the damage assessment system with yield increasingly accurate results.

In an embodiment, the damage detection system described above can be applied to 3D models of the surface of the damaged vehicle that are derived from multiple overlapping images using a structure-from-motion algorithm. So instead of analysis of individual photographs or images, the machine learning is applied to the 3D model.

Images derived from point swarms of remote sensing data (for example Lidar) are also applicable for use in machine learning object recognition software as described above.

The observer can be a human or a remotely operated vehicle or a specific apparatus for documenting damage. For example, upon returning a rental car, the car is driven thru a rigid scanner containing multiple cameras. The images are then compared to images taken after the previous rental period and any damage is identified. The renter is then billed accordingly for any incurred damage.

In a further alternative embodiment, a first step is to create a library of images and associated information for undamaged vehicles of all types and models of interest. In addition, each vehicle must have a 3D model generated. The 3D model could come from the car manufacturer, the model could be generated from the images (see for example a depth-from-motion algorithm https://www.spar3d.com/news/vr-ar/google-updates-arcore-with-new-depth-api-seeks-collaborators/which is incorporated herein by reference in its entirety). The 3D model can be represented as a triangular mesh of the surface of the vehicle.

A significant number of images are taken of the surface for all vehicles of interest (every make, model and model year). These vehicles are in new condition. Generally eight or more images are created that show the front, back, and two side of the vehicle with oblique images made at the four corners. For each of the images, features are identified (see FIG. 15) and the location of the features within the image is input into the machine learning/AI algorithm. Features include vehicle components such as left front fender, wheels, head lights, windshield, front grill, roof, tires, etc. An additional part of the training set information, in some embodiments, would be the orientation of the camera relative to the car, the distance to the car along the perpendicular vector from the camera to the point on the car which is the centroid of the image and the exposure parameters of the image.

In addition to inference of distance from multiple images, inexpensive active imaging techniques such as LIDAR are also available in which a point cloud is created given 3D models of surfaces millimeter accuracy.

A portion of the images for each vehicle are included in a training set with the remainder of the images placed in a sample set. The machine learning algorithm then iterates on a solution which can identify the vehicle components that are visible in the sample set with the highest accuracy. The AI must be trained to recognize the type and model of a vehicle in the sample set images along with the orientation of the vehicle in the image and the scale of the vehicle in the image.

Once a significant number of images are compiled, and they are annotated with the type of information described above, then the images can be separated into a training set and a sample set. The algorithm then analyzes the training set and tries to analyze what it is seeing in the sample set. This is an iterative process whereby the model is modified based on feedback on how well the model identified various the vehicle and components (and later damage) in the sample set. Once the identification is optimized, then it can be used in a real world scenario. Training of the algorithm can continue periodically and indefinitely to continue refining the accuracy of identification of vehicle features and damage to those features.

The 3D model is utilized for comparison to the images in the sample set. The triangular mesh is projected at numerous scales and orientations until the projection of the mesh aligns with the outline of the vehicle in an image. The same process is repeated for individual vehicle components.

Model for Recognizing Damage—Alternative Embodiments

A second set of images is taken of types of damage that have occurred at various locations on vehicle exterior panels and components. In an embodiment, all damage images are for specific vehicles. Alternatively, damage images are taken from multiple types of vehicles and put in the same training set. Further information is associated with each image of damage that defines the force and trajectory of the impact that caused the damage. FIG. 15 illustrates this concept. There is an image of a right front bumper with a scuff and some scratches. For the training set, objects that could be identified and located in the image are the right front of the bumper; a partial right headlight, a large scuff/scratched area and a couple of scratches. It is further observed and documented that there are striations on the large scuff which are deeper towards the front of the scuff/scratch (with respect to the front of the car) and which are oriented approximately horizontal with respect to the ground. This implies that the scuff was created by an impact with an object that had a relative motion opposite to that of the vehicle.

In an embodiment, a Mask Regional Convolutional Neural Network (Mask R-CNN) is used to detect vehicle damage, but any machine learning technique that is capable of analyzing large quantities of images and is able to detect patterns that are either vehicle components and/or damage to vehicle components would work.

Figure 16:
FIG. 16 is an image showing front end collision to a vehicle from which damage identification and estimation may be made according to embodiments disclosed herein.

FIG. 16 shows an example of a typical image input showing of a front end collision. In the photo we can identify a damage hood, passenger side wheels and tires, a driver side headlight, damaged front grill, windshield, etc. We know the car is a Honda Element and it collided with some object on the passenger side approximately at a 45 degree angle relative to the front of the car. The impact was approximately at bumper height. All this information is put into a training database.

The AI is trained to recognize types and severity of damage associated with all panels or components of a vehicle of interest. The information associated with the images comprises:
Damage type
    Vehicle component damage is on
    Force and Direction of the image (relative to the vehicle)
    Direction to look for other damage.
    Other components that might have sustained damage based the component, type and severity of the identified damage
    The images of damage must be oriented relative to the 3D model for the undamaged vehicle. This is down like described for the undamaged model.
Application Interface
    Once the Artificial Intelligence Knowledge Base is created and calibrated, then it can be applied using an user application that interacts with the knowledge base.
    Application programming interfaces can take the form of an app on a mobile device; a user interface associated with a remotely operated vehicle or a stationary scanner that a vehicle drives thru or passes over a stationary vehicle.
    When a vehicle is damage, an observer takes one or more pictures of the damage. The picture or pictures should ideally have enough of the undamaged vehicle in it so that the vehicle can be identified by the AI and also orientation of the vehicle in the image can be determined.

A suitably trained Artificial Intelligence Model can determine the make and model of the vehicle along with what panels or components are visible. If, based on the image/s available to the AI model, the vehicle cannot be identified, the observer is asked to acquire more images or manually identify the make and model (or alternatively provide the VIN number).

Once the vehicle, and vehicle orientation are determined, the application further identifies the panels or components that are visible by comparing a 3D model of the vehicle projected into the 2D space of the image/s and varying the scale and orientation of the 3D model until there is a match between the projection of the 3D model and the 2D image frame.

Figure 17:
FIG. 17 is an example of an image of a vehicle tailgate with damage, which may be presented as an input to systems and methods disclosed herein.
Figure 18:
FIG. 18 shows the damaged vehicle image of FIG. 7 after processing with areas of damage identified in accordance with disclosed embodiments.
Figure 19:
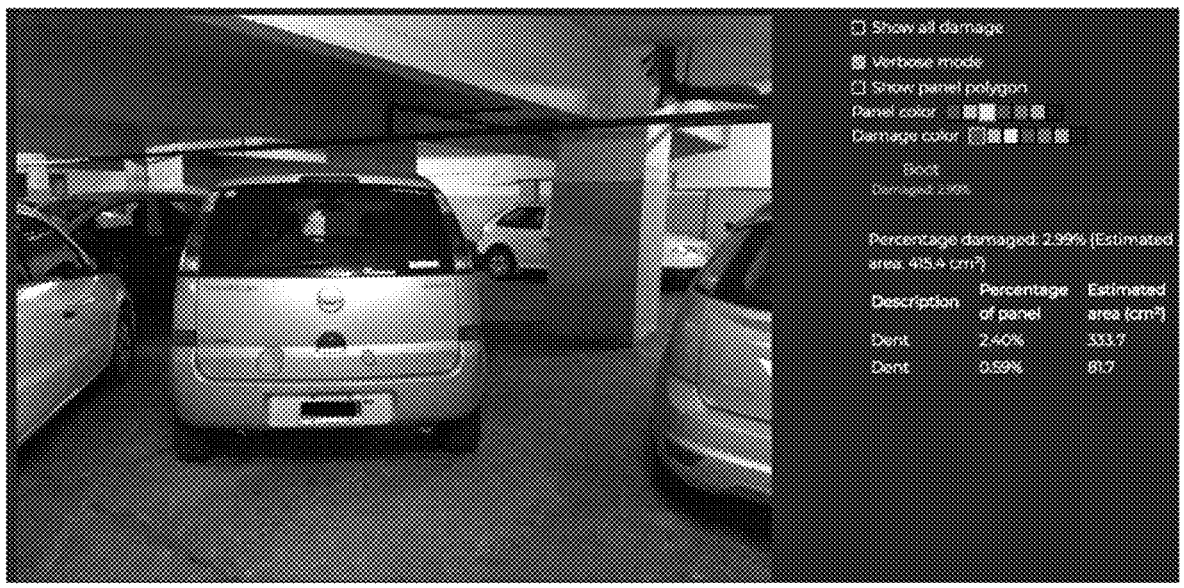
FIG. 19 presents an example of a user interface displaying the vehicle shown in FIGS. 7 and 8, and identifying damage and estimating extent of damage in accordance with disclosed embodiments.

Next the application compares the image/s of the damaged vehicle with the image model in the AI for the undamaged vehicle and finds the damage including the size and extent. FIGS. 17, 18 and 19 show an image of damage, damage identified by an AI and a user interface that displays the extent of the damage.

Where possible (where the training set was sufficient to do so), the application determines estimated force vector for the damage impact also from the image/s taken of the damage. The API then suggests where additional damage associated with the force vector may be located on the vehicle based on the knowledge base in the AI. The observer can then acquire more images to look for addition damage. Once the damage is assessed, it is reported in the user interface.

Alternative embodiments of systems and processes for determining damage from a single or multiple images are outlined below:
Single Image
    1) Where the image of the vehicle is at an oblique angle, and this is used to identify damage and damage size.
    2) The vehicle make and model are determined using the AI process.

3) The damage area is detected using the AI damage detection process.
4) The orientation of the vehicle in the image is determined
   a. Using the wire frame (3D) model for the vehicle and the panel that is damage, the wire frame is rotated, shifted and tilted on all axes to fit to the vehicle in the image.
   b. From the above the special orientation of the vehicle in the image is now known.
   c. The detected damage can now also be spatially mapped, and hence the actual size of the damage determined.
5) Output is damage size.

Multiple Images
1) Where the damage is only partly visible in one image, multiple images need to be used to determine the full extent of the damage.
2) Partial size of damage is determined using method A, for the separate images.
3) From Method A, the special orientation and scaling is determined
4) Using the special orientation, as well as techniques such as Homography, the images are used to generate projections.
5) These generated projections are then the basis for which the full extent/size of the damage is determined.

Post Processing

Periodically when the application has been used a number of times, an operator can assess how well the predictions of damage were made. The results of the prediction can be modified as necessary, manually, and the modified results and the images can then be incorporated into a new training set to update the model.

Figure 21:
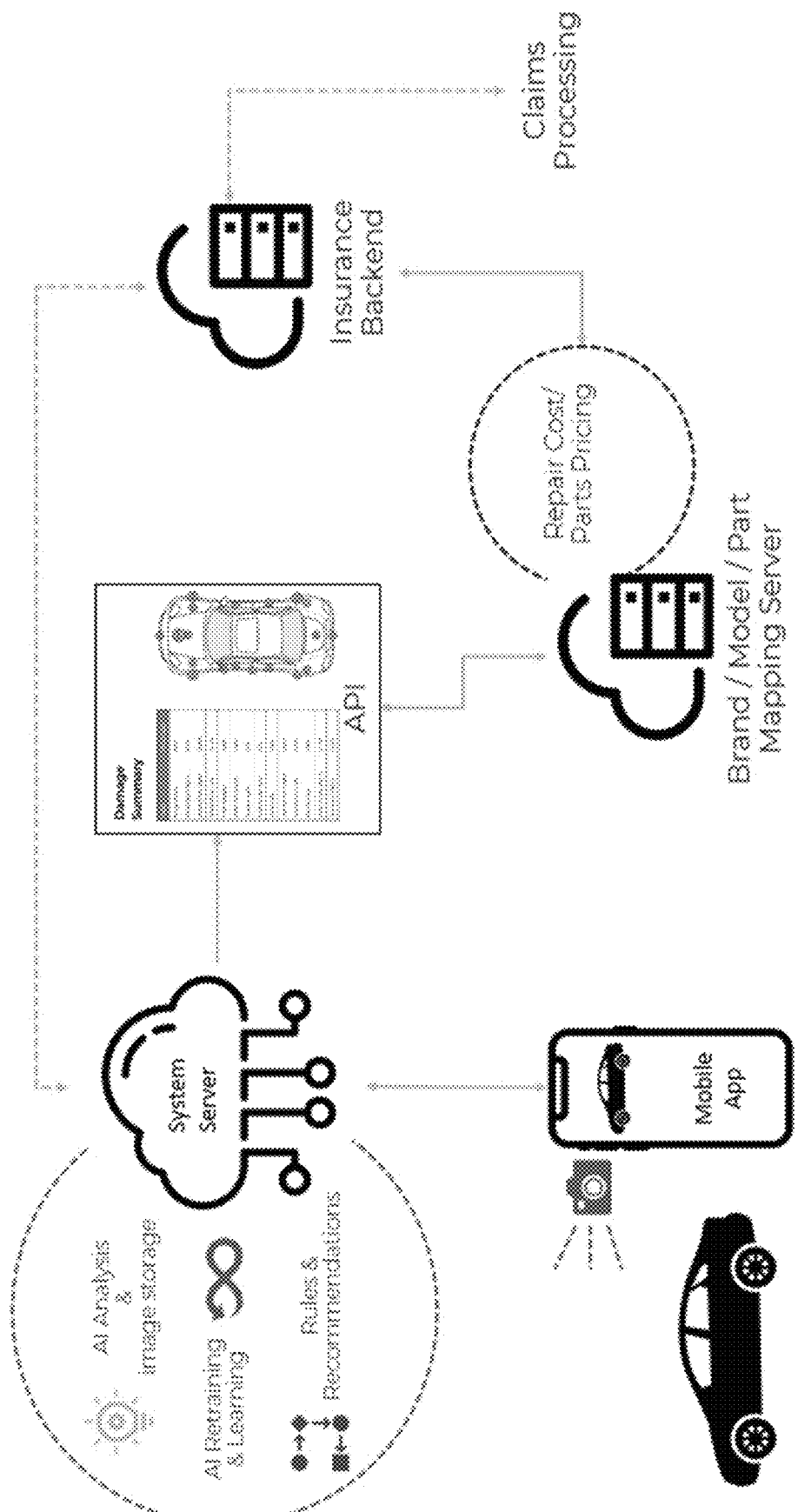
FIG. 21 is a block diagram schematically depicting a networked system for vehicle damage identification, analysis and reporting according to an embodiment of the present disclosure.
Figure 23:
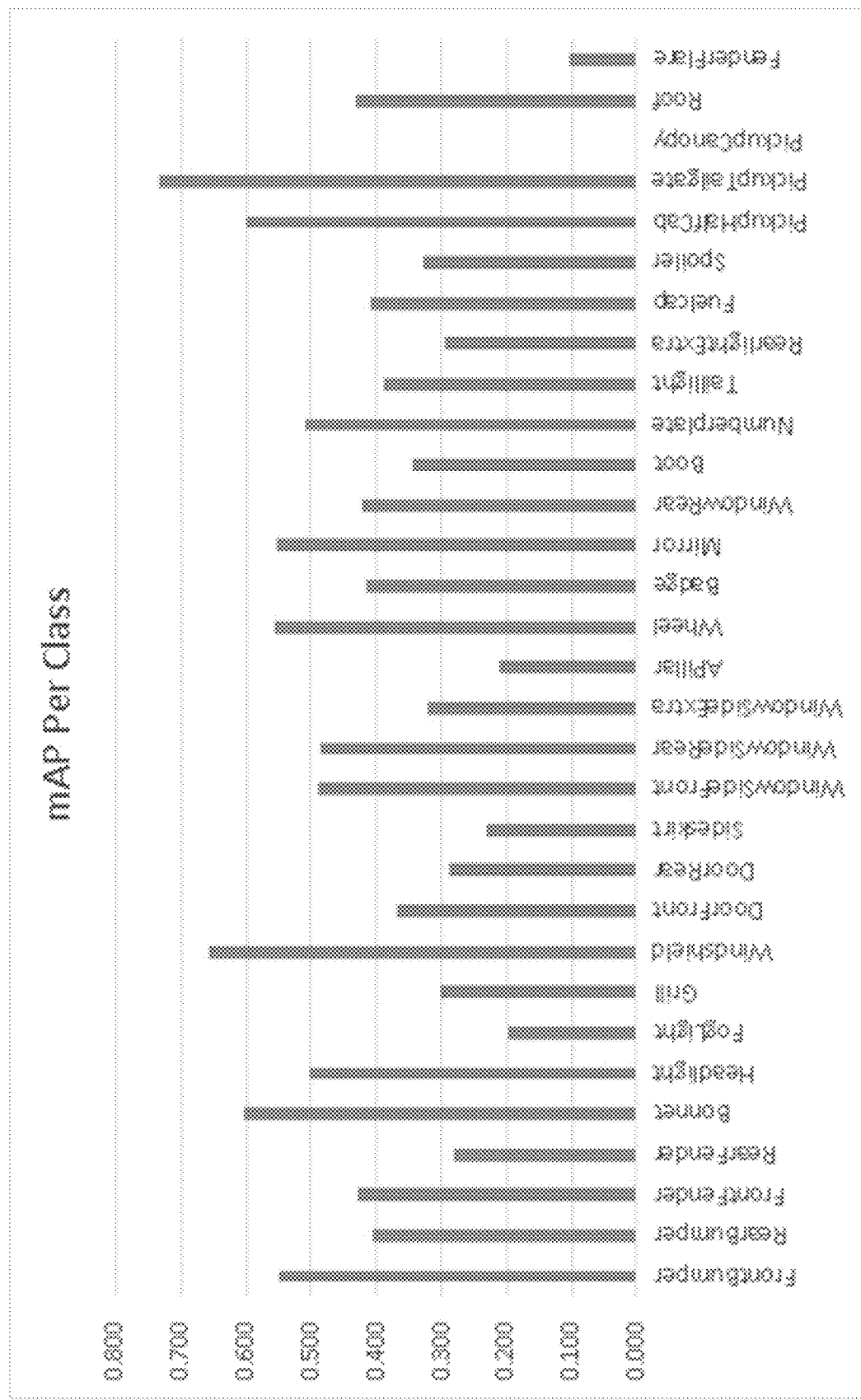
FIG. 23 is a plot showing mean average precision (mAP) for vehicle panel identification in tests conducted by the present application using various object recognition/image analysis systems available prior to the present disclosure.
Figure 24:
FIG. 24 is a plot showing mAP results for object recognition with respect to specific objects typically found images of damaged vehicles in tests of prior systems.

FIGS. 20A through 20G show screen shots of an embodiment of a user interface (UI) for facilitating user interaction with the systems and methods described herein. Use Cases which may employ such a UI, or disclosed embodiments in general, include insurance, vehicle sale, vehicle rental often employing a trained technician or assessor. In one example of a use case, a technician downloads and installs the system mobile application. A vehicle is bought to the assessment location, which may simply be a parking lot in a convenient location, for damage assessment. The technician is guided by system UI, for example as shown in FIGS. 20A-G, through the process of taking images of the vehicle. The system backend identifies the vehicle, automatically estimates extent of damage, and dompares current assessment with previous assessments, among other functions as described herein. The system backend provides also may provide services such as notification and reporting management or portal. FIG. 21 presents a block diagram of one example of such an overall system.

In some embodiments, system 10 may be executed as one or more computing devices 500 as illustrated in FIG. 22. In this example, computing device 500 includes one or more processors 502, memory 504, storage device 506, high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses or other suitable connections as indicated in FIG. 22 by arrows connecting components. The processor 502 can process instructions for execution within the computing device 500, including instructions stored in the memory 504 or on the storage device 506 to display graphical information via GUI 518 with display 520, or on an external user interface device, coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

Memory 504 stores information within the computing device 500. In one implementation, the memory 504 is a computer-readable medium. In one implementation, the memory 504 is a volatile memory unit or units. In another implementation, the memory 504 is a non-volatile memory unit or units.

Storage device 506 is capable of providing mass storage for the computing device 500, and may contain information such as databases containing vehicle metadata, vehicle models and/or other types of vehicle information as described hereinabove. In one implementation, storage device 506 is a computer-readable medium. In various different implementations, storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

High speed controller 508 manages bandwidth-intensive operations for the computing device 500, while low speed controller 512 manages lower bandwidth-intensive operations. Such allocation of duties is exemplary only. In one implementation, high-speed controller 508 is coupled to memory 504, display 520 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices as part of GUI 518 or as a further external user interface, such as a keyboard, a pointing device, a scanner, or a networking device such as a switch or router, e.g., through a network adapter.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of wired or wireless digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for automated estimation of vehicle damage, comprising:
    receiving at an image recognition core plural images of a vehicle from different view angles;
    using automated, computer-based image analysis techniques—
        determining the presence of a vehicle of interest in the received images,
        determining make and model of the vehicle of interest,
        determining vehicle registration, and
        determining vehicle orientation in the received images,
    using computer-based object recognition techniques—
        identifying a plurality of distinct panels on the vehicle,
        identifying areas of damage on identified panels, wherein identification of damage comprises both extent of damage and depth of damage, and
        determining absolute damage size for identified areas of damage, wherein determination of absolute damage size comprises homographic and allometric analysis of areas of identified areas of damage; and
    applying pre-defined rules to the identified panels, identified damage and determined absolute damage size to generate a damage repair estimate.

2. The method of claim 1, further comprising:
    capturing plural images of a vehicle from different view angles; and
    transmitting the captured images to the image recognition core.

3. The method of claim 1, wherein said steps of using automated, computer-based image analysis techniques and using computer-based object recognition techniques are executed on 2D images.

4. The method of claim 3, further comprising, after or separate from said steps of using automated, computer-based image analysis techniques and using computer-based object recognition techniques, generating a 3D model of the vehicle using the received 2D images.

5. The method of claim 4, further comprising displaying the 3D model with areas of identified damage superimposed therein to a user through a user interface.

6. The method of claim 5, further comprising generating a report summarizing areas of damage and repair cost estimates.

7. A system for automated estimation of vehicle damage, comprising at least one processor communicating with at least one information storage device, wherein said at least one processor is configured to execute instructions retrieved from the at least one storage device, said instructions when executed by the at least one processor causing the system to:
    receive plural images of a vehicle from different view angles;
    use automated, computer-based image analysis techniques to— determine the presence of a vehicle of interest in the received images,
determine make and model of the vehicle of interest,
determine vehicle registration, and
determine vehicle orientation in the received images,
use computer-based object recognition techniques to—
identify a plurality of distinct panels on the vehicle,
identify areas of damage on identified panels, wherein identification of damage comprises both extent of damage and depth of damage, and
determine absolute damage size for identified areas of damage, wherein determination of absolute damage size comprises homographic and allometric analysis of areas of identified areas of damage; and
apply pre-defined rules to the identified panels, identified damage and determined absolute damage size to generate a damage repair estimate.

8. The system of claim 7, wherein said instructions to use automated, computer-based image analysis techniques and to use computer-based object recognition techniques comprise instructions to execute said operations on 2D images.

9. The system of claim 8, further comprising, instructions to generate a 3D model of the vehicle using the received 2D images, after or separate from said operations of using automated, computer-based image analysis techniques and using computer-based object recognition techniques.

* * * * *